US010042817B2

(12) United States Patent
Hiller et al.

(10) Patent No.: US 10,042,817 B2
(45) Date of Patent: Aug. 7, 2018

(54) GENERATING OPTIMIZED GEOMETRIES

(71) Applicant: Frustum Inc., New York, NY (US)

(72) Inventors: Jonathan Hiller, Boulder, CO (US); Jesse C. Blankenship, Denver, CO (US)

(73) Assignee: FRUSTUM INC., New York, NY (US)

( * ) Notice: Subject to any disclaimer, the term of this patent is extended or adjusted under 35 U.S.C. 154(b) by 172 days.

(21) Appl. No.: 15/079,815

(22) Filed: Mar. 24, 2016

(65) Prior Publication Data

US 2016/0299994 A1    Oct. 13, 2016

Related U.S. Application Data

(60) Provisional application No. 62/145,350, filed on Apr. 9, 2015.

(51) Int. Cl.
G06F 17/50 (2006.01)
G06F 17/11 (2006.01)

(52) U.S. Cl.
CPC .......... *G06F 17/11* (2013.01); *G06F 17/5009* (2013.01); *G06F 17/5086* (2013.01)

(58) Field of Classification Search
CPC .. G06F 17/50; G06F 2217/02; G06F 3/04815; G06F 3/0484; G06T 19/20; G06T 2219/2021; G05B 2219/49023
USPC ............................................................. 703/1
See application file for complete search history.

(56) References Cited

U.S. PATENT DOCUMENTS 6,133,922 A    10/2000  Opitz

| | | |
|---|---|---|
| 2005/0060130 A1* | 3/2005 | Shapiro ............... G06F 17/5018 703/2 |
| 2006/0202987 A1 | 9/2006 | Harada |
| 2007/0257909 A1 | 11/2007 | Kihslinger |
| 2013/0201244 A1* | 8/2013 | Benedicto ............... B41J 2/175 347/19 |
| 2013/0238297 A1* | 9/2013 | Lepage .................. G01V 99/00 703/2 |
| 2013/0297058 A1 | 11/2013 | Griffith et al. |

FOREIGN PATENT DOCUMENTS

EP    1760663 A2    3/2007

OTHER PUBLICATIONS

Christiansen et al. "Automatic balancing of 3D models", Computer-Aded Design, vol. 58, Jan. 2015, pp. 236-241.*

(Continued)

*Primary Examiner* — Kamini S Shah
*Assistant Examiner* — Russ Guill
(74) *Attorney, Agent, or Firm* — Perkins Coie LLP

(57) ABSTRACT

Embodiments disclosed herein provide systems and methods optimizing geometries. In one embodiment, a computer-implemented method is provided. The method includes receiving, at a programmed computing device, a geometry comprising a plurality of edges and selecting a set of edges from the plurality of edges based on an intersecting location in which two or more the edges intersect. For each edge of the set of edges, a density is determined that corresponds to the intersecting location for the set of edges. The method further includes determining a target density related to the intersecting location in view of an aggregate of the density associated with respective edges of the set of edges. The target density indicates a gradient of a falloff for the intersecting location.

20 Claims, 11 Drawing Sheets

(56) References Cited

OTHER PUBLICATIONS

Lu et al. "Build-to-last: Strength to Weight 3D Printed Objects", ACM Transactions on Graphics, vol. 33, No. 4, Article 97, Jul. 2014.*

Kintel "3D Modeling with OpenSCAD—Part2", pp. 87-90, Low-Cost 3D Printing for Science, Education Sustainable Development, pp. 1-202, ICTP—The Abdus Salam International Centre for Theroetical Physics 2013 ICTP Science Dissemination Unit, May 2013, First Edition.*

X.Y. Kou et al., "Heterogeneous object modeling: A review," 2007, Computer-Aided Design, vol. 39, pp. 284-301.*

X.Y. Kou et al., "Modeling complex heterogeneous objects with non-manifold heterogeneous cells," 2006, Computer-Aided Design, vol. 38, pp. 457-474.*

Y.K. Siu et al., "Source-based heterogeneous solid modeling," 2002, Computer-Aided Design, vol. 34, pp. 41-55.*

PCT, International Search Report and Written Opinion of the International Searching Authority, or The Declaration, dated Aug. 4, 2016 for PCT/US2016/024536 (10 pages).

* cited by examiner

GENERATING OPTIMIZED GEOMETRIES

CROSS REFERENCE TO RELATED APPLICATION

This application claims the benefit of U.S. Patent Application No. 62/145,350, filed Apr. 9, 2015, the entire disclosure of which is incorporated herein by this reference.

TECHNICAL FIELD

Embodiments of the present disclosure relate generally to a system for generating optimized geometries, and more specifically, to techniques for automatic inclusion and optimization of fixturing geometries.

BACKGROUND

There are many techniques for generating geometries used in the fabrication of a target three-dimensional (3D) object. In one such technique, "3D printing" allows for the fabrication of highly complex geometries which are often used to solve difficult engineering and design problems. For example, wire frame, lattice and other types of complex meshes associated with 3D printing are currently used for the creation of structural scaffolding or supports with a wide range of application in the fields of engineering and design.

Existing 3D modeling software used to generate these complex meshes are often limited. One major barrier is that accurate fixturing geometries (bolt holes, flanges, pins, bearing mounts, etc.) are typically a post-processing step. Moreover, some fixture features require a precise "hard" geometry (such as an exact diameter opening for an alignment pin) that current design techniques are not capable of accurately capturing or recreating in a computationally tractable manner.

In some situations, when certain fixture features or physical constraints are to be included in particular design geometries, one example technique may apply Boolean operations to add and remove specific platonic geometries. However, this may result in an un-optimized final geometry that may also include certain side effects.

FIG. 1 illustrates an example geometry 100. In this example, the final design of geometry 100 may inelegantly mash platonic fixturing geometries and hard boundaries to portions of geometry 100. As illustrated in FIG. 1, this may result in geometry 100 having one or more large stress concentration points 102 at intersections as well as the possibility of wasted material at certain locations 104 (e.g., sharp corners).

Accordingly, there is a need for improved methods and systems to rapidly transform geometries to an efficiently designed final form without introducing undesired or unwanted extra features.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit changes in form and detail to the techniques described herein, which may be made by one skilled in the art without departing from the spirit and scope of the disclosed implementations.

DETAILED DESCRIPTION

Embodiments of the present disclosure are directed to a system for generating optimized geometries. The system may be adapted to receive, using one or more computing devices, a geometry comprising a plurality of edges. A set of edges from the plurality of edges may be selected based on an intersecting location in which two or more the edges intersect. A density may be determined for each edge of the set of edges. This determined density corresponds to the intersecting location for the set of edges. A target density related to the intersecting location may be determined in view of an aggregate in the density associated with respective edges of the set of edges. The target density may indicate a gradient of a "falloff" for the intersecting location. For example, a falloff may also be referred to as a "blending" (e.g., combining or missing) of two shapes at the intersecting location.

Once the target density is determined, the density associated with one or more edges of the set of edges may be adjusted to approach the target density for the intersecting location. In turn, this may optimize the geometry for use in certain types of applications, such as for use in a 3D printing application or other types of manufacturing techniques (e.g., casting, injection molding) used to fabricate geometries. This example should not be considered as limiting the scope of the disclosure or usefulness of the features of the present disclosure. For example, the features and techniques described herein can be used with various types of systems using digital geometries, thereby significantly improving the ability of the systems to efficiently generate optimized 3D objects for creating real-world products as well as for various kinds of modeling tools. In other embodiments, various type of freeform geometries can be optimized using the techniques described herein, such as those formed from an ordered grid of scalar density values, and some that are automatically generated to satisfy certain physical conditions (e.g., forces and constraints) as specified, such as minimizing strain energy.

I. Density Features

Figure 1:
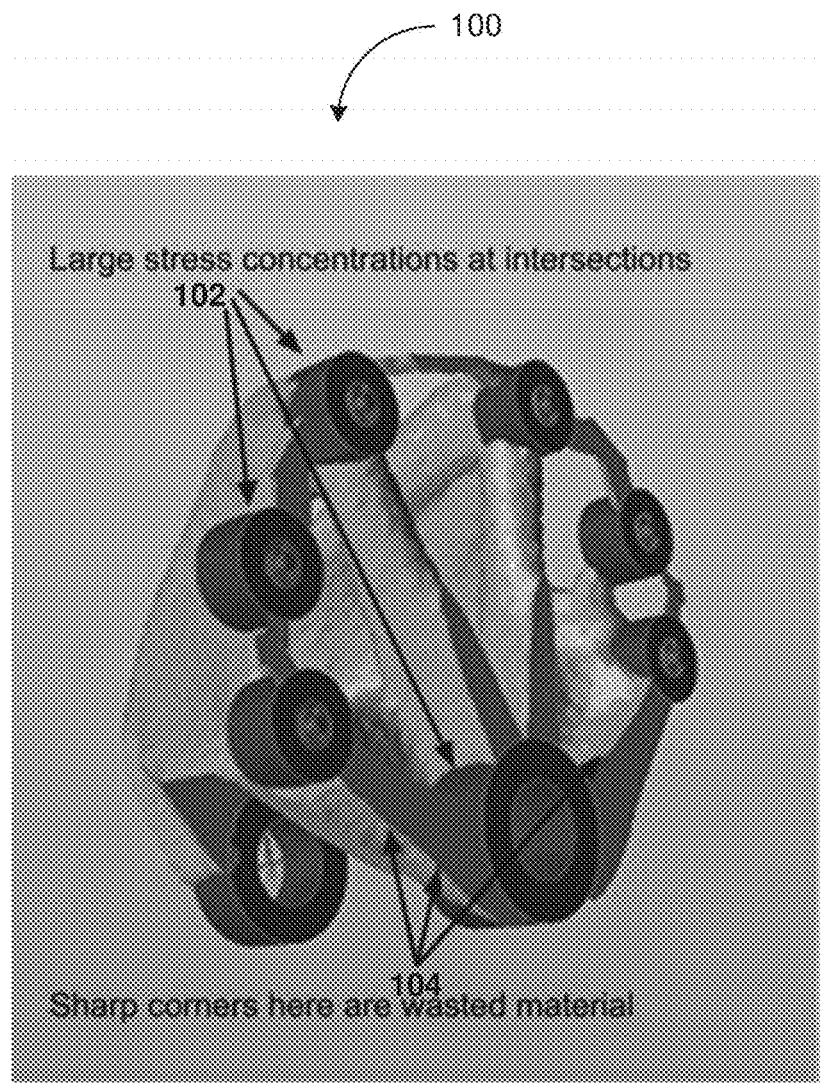
FIG. 1 illustrates an example geometry.
Figure 2:
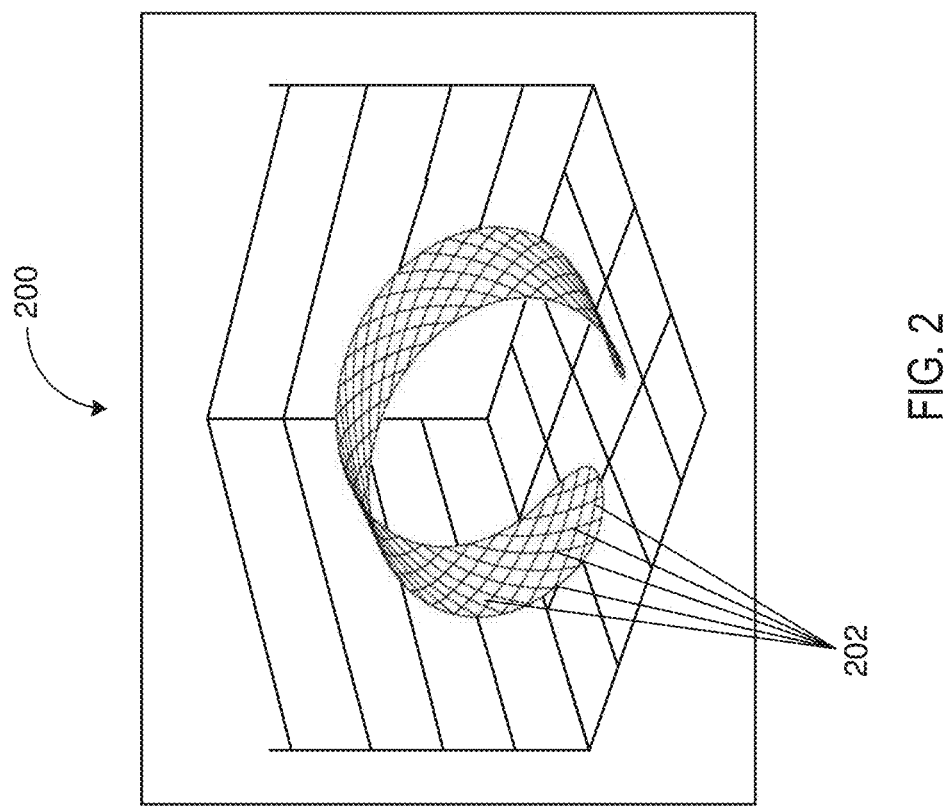
FIG. 2 illustrates an example geometry in accordance with in accordance with various implementations.

Referring now to the drawings wherein like reference numbers correspond to similar components throughout the several views and, specifically, referring to FIG. 2, the disclosed subject matter shall be described in the context of example geometry 200 depicted as a 3D mesh, also referred to as a 3D volume. Typically a 3D volume is enclosed or otherwise defined by surfaces with the surfaces themselves being bounded by edges and edges bounded by vertices. In this regard, an edge may be defined as a boundary of any dimension. As illustrated in FIG. 2, the geometry 200 may comprise a plurality of edges 202. In this regard, the plurality of edges 202 may represent a defined body of geometry 200. As discussed above, the present disclosure may provide techniques for optimizing the geometry 200 for use in various applications.

To accomplish this, a target density of a series of density features (e.g., density of edges at an intersecting location) for a given set of edges in the geometry 200 may be determined. The density features may include not only the target density but also the gradient (e.g., rate of change) of the density, which can range from near-infinite (e.g., at a sharp edge) to zero (e.g., unchanging region). In some embodiments, these density features can have differing defined densities, for example, in an interior, exterior or boundary region with some regions having a positive space (e.g., material present) and some with a negative space (e.g., material absent).

In one embodiment, the target density may include estimates for thickening and/or thinning particular density features associated with the edges in order to generate an optimized 3D mesh. The target density estimates for the density features may include a set of density parameters for determining how an edge of a particular density feature behaves or gradually transitions to another density feature. The density features may also include loading information (for multiple physical loading scenarios) including fixed displacement and forces that may be applied to certain portions of the features in a real-world simulation.

Figure 3:
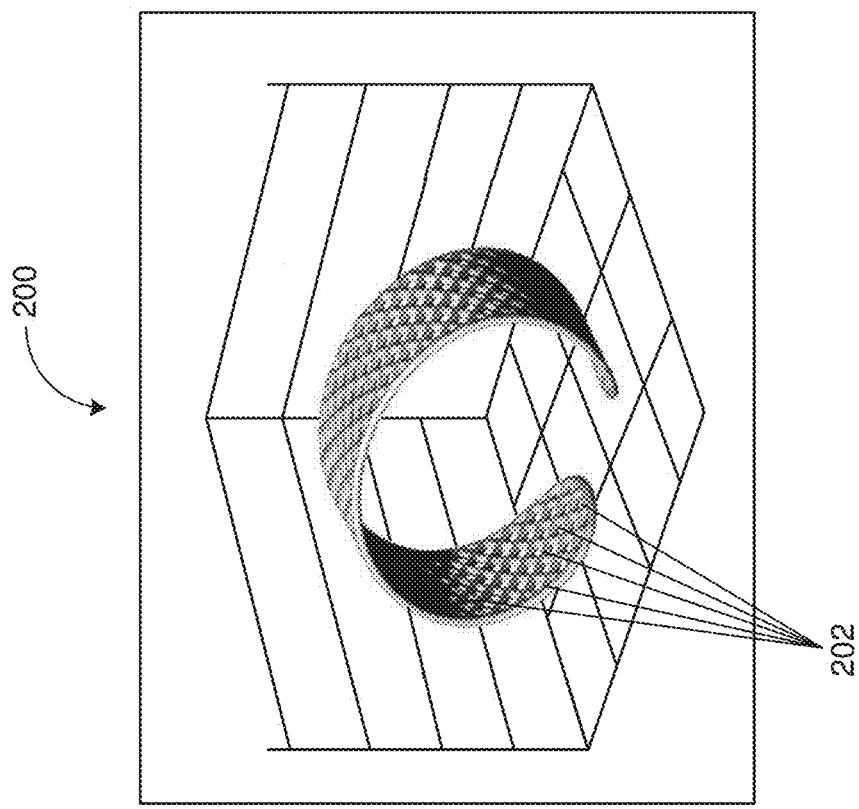
FIG. 3 illustrates another view of the geometry of FIG. 2 in accordance with in accordance with various implementations.

Referring to FIG. 3, another view of geometry 200 is illustrated. In this example, the density features of geometry 200 are adjusted. In some embodiments, the density parameters associated with the density features may be adjusted so that geometry 200 can achieve desired strength/weight density ratios at respective locations. For example, by adjusting the density parameters, the techniques described herein may calculate a blending of positive space (e.g., material present) and negative space (e.g., material absent) with regard to the density features associated with the plurality of edges 202. This blending of spaces may be accomplished by using a falloff calculation that may dictate how the edge of a density feature may transition to the next density feature. For example, the absence of a falloff may indicate that the density feature stops abruptly at its edge. In some embodiments, the density of a particular density feature may be defined as the density of that feature multiplied by a density multiplier of the falloff at distance "d", where "d" may be at a specific location outside of the feature.

Figure 4:
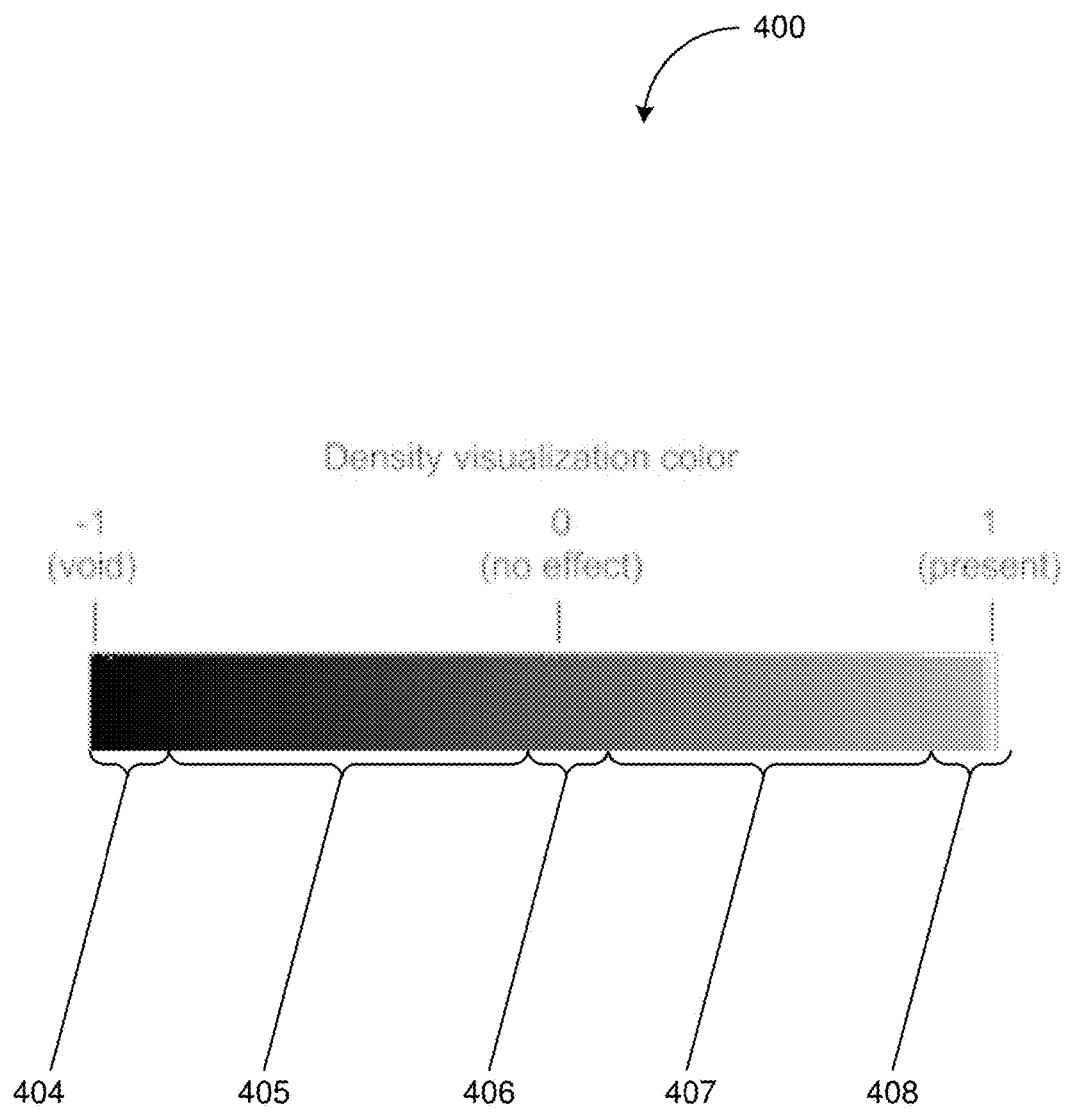
FIG. 4 illustrates an example of a density graph in accordance with in accordance with various implementations.

FIG. 4 illustrates an example of a density graph 400. In some embodiments, the density multiplier of a particular density feature may be within a particular range. As illustrated in FIG. 4, the density graph 400 may range from a value of −1 to 1. Numerical "−1" may represent that there may be no material definitely present at this location of the feature. Numerical 1 may represent that material may be definitely present at this location of the feature. At a midpoint, numerical "0" may represent a threshold level indicating that there may be no ascertainable effect at the location of the density feature.

In FIG. 4, regions 404-408 of the density graph 400 may represent a certain amount of material at a given location of density features. For example, region 404 of the density graph 400 may represent negative space or a void where a certain amount of material may be preferentially or absolutely absent or removed from a given location. This can indicate either a "hint" or "command" to remove material in that given location. Region 408 may represent positive space where a certain amount material may be preferentially or absolutely present or otherwise added to the density feature. This can indicate either a "hint" or "command" to add material in that given location. Region 406 may represent a natural space, for example, of a location where the material associated with the density feature may be unchanged. Regions 405 and 407 may represent locations where there may be a proportional blending of positive and negative space with regard to the density features. For example, this blending may be accomplished using falloffs associated with edges of the density features. As noted above, the falloffs may indicate how a certain edge of a density feature may transition from one density feature to another density feature.

Figure 5:
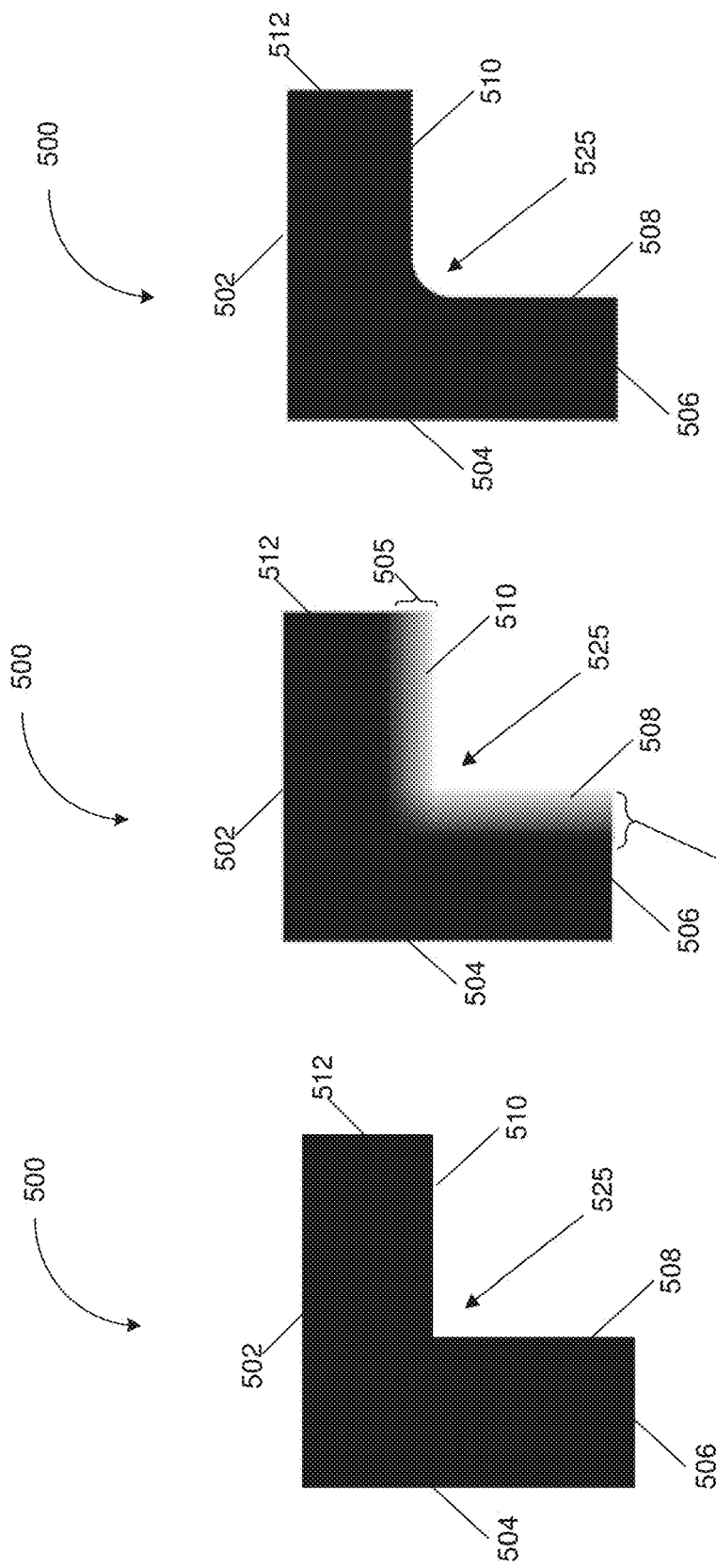
FIGS. 5A-5C illustrates another example geometry in accordance with aspects of the present disclosure.

Referring to FIGS. 5A-5C, another example of a geometry 500 is illustrated. The geometry 500 may be compared to geometry 200 of FIG. 2. For example, geometry 500 similarly comprises a plurality of edges 502-512 that may be compared to the edges 202 of geometry 200. In this example, edges 502-512 define the body of geometry 500.

As illustrated in FIG. 5A, certain edges 502-512 of the geometry 500 may intersect at a particular location. For example, edges 508 and 510 sharply intersect at a location associated with falloff 525 with respect to geometry 500. As illustrated in FIG. 5B, a density feature range 503 for edge 508 and a density feature range 505 for edge 510 may be determined for each respective edge associated with the falloff 525. These density features may be blended (e.g., aggregated) together based on the falloff 525, which controls how the edges 508 and 510 of the density features may transition to one another. In FIG. 5C, the geometry 500 is illustrated as having a gradually inclining radius that may remove any sharp edges previous at the falloff 525, thus eliminating stress concentrations at the intersection of the two edges 508 and 510.

II. Falloffs

In one embodiment, the shape of a falloff may be represented by the following equation:

$$D = A/x$$

In this equation, "D" represents the density of the density feature associated with the falloff at a distance "x" from the feature and "A" represents a constant in a given unit (e.g., millimeters) that defines sharpness of the falloff. For example, if A=0, this may denote that there may not be a falloff associated with this density feature, thus an edge of the feature may include sharp corners.

Figure 6:
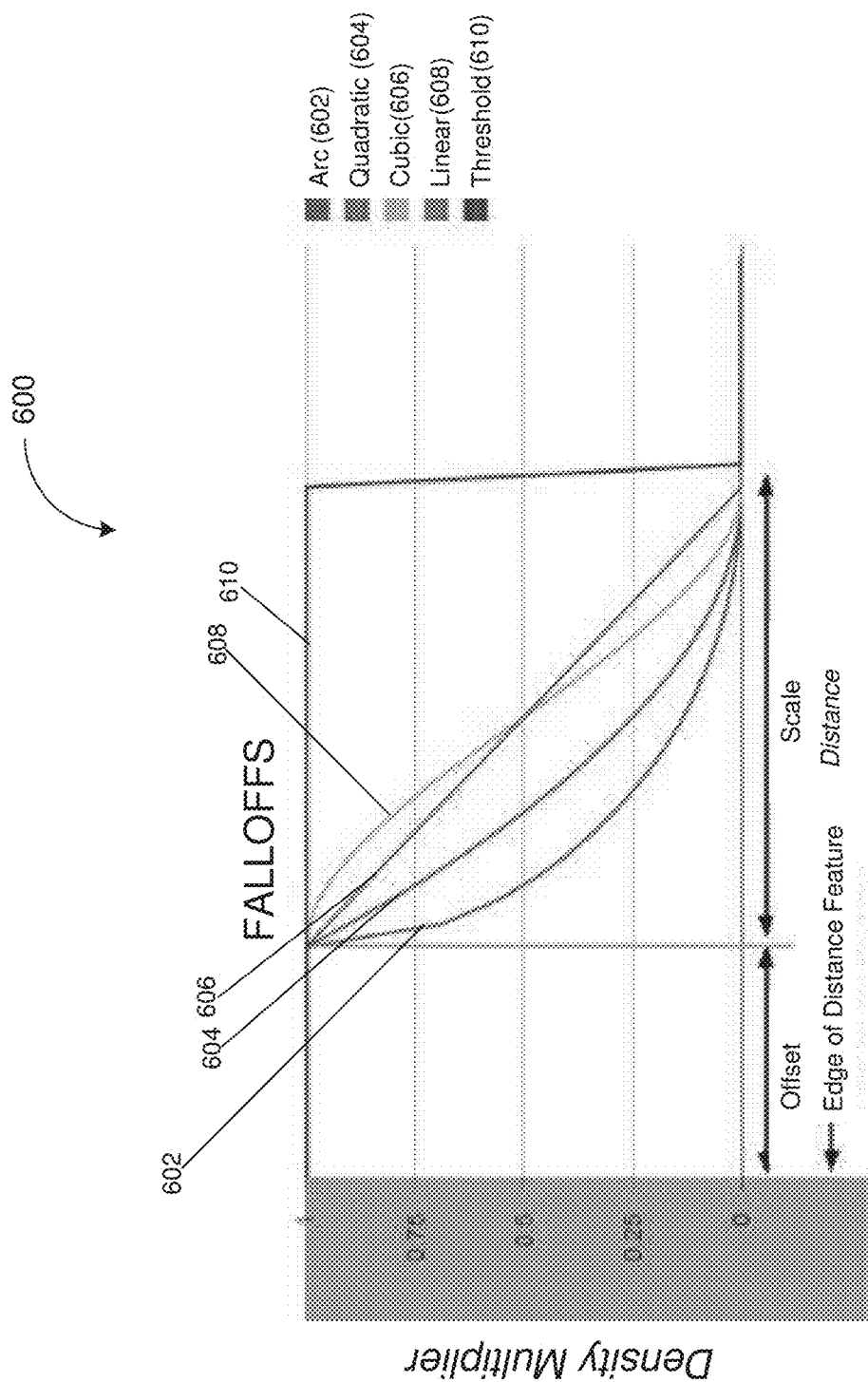
FIG. 6 illustrates a graph of falloff curves in accordance with in accordance with various implementations.

FIG. 6 illustrates a graph 600 of falloff curves 602-610. There are several parameters that may control the falloff curves 602-610, which may include but are not limited to a profile, scale and offset parameter. In some embodiments, these parameters may establish a factor that can be used to formulate the gradient of a given falloff. As illustrated in the graph 600, a particular shape or gradient of a given falloff curve may be arranged in view of some example profile parameters that may include arc 602, quadratic 604, cubic 606, linear 608 and threshold 610. All of the shapes of the falloff curves 602-610 may begin at a density multiplier of 1 and end at a density multiplier of 0 with regard to a scale parameter.

In some embodiments, the shape of each falloff curve in the graph 600 may be represented by the following equations:

Arc: $D=1-\sqrt{1-((d-o)-s)^2/s^2}$

Quadratic: $D=((d-o)-s)^2/s^2$

Cubic: $D=2*(d-o)^3/s^3-3*(d-o)^2/s^2+1$

Linear: $D=1-(d-o)/s$

Threshold: $D=1$

In each equation, "D" represents the resulting density multiplier, "d" represents distance from a density feature in a given unit, "s" represents a scale parameter and "o" represents an offset parameter. These parameters are discussed in further detail below.

The scale parameter may indicate an extent of the falloff in a given unit from a surface of the density feature. For example, if the units are in millimeters, a scale value of "10" indicates that the falloff may operate between a distance of 0 and 10 mm from the surface and may have no effect beyond 10 mm. It should be noted that the falloffs are not necessarily bounded and can in some situations extend to infinity (such as with a Gaussian or 1/x type of equation).

The offset parameter may indicate an amount of shift in the falloff towards or away from the surface in real units (e.g., millimeters). For example, a positive offset may indicate that additional "padding" may be placed around a feature before the falloff commences. As a result, this may extend the extent of the falloff region. Negative offsets may indicate that the original density feature may shrink. For example, the negative offsets may indicate that the falloff profile should be clipped by a certain amount close to the density feature surface.

In some embodiments, the density feature parameters can also include a parameter that may indicate a primitive type or a group of primitive types. The primitive types may be used to indicate a desired shape associated with the density feature. Each primitive type may have a density parameter that ranges from numerical "-1" to "1" (inclusive), where "1" may indicate the presence of material, "-1" may indicate the absence of material, and "0" may indicate no effect on the density. As noted, an interior, exterior or boundary region of the density features can have differing defined densities with some regions having a positive space (e.g., material present) and some having a negative space (e.g., material absent).

In some embodiments, a primitive type can also be inverted, which may indicate that an outside region of the density feature may receive a specified density while an inside region may not be affected. It should be noted that falloffs and boundaries may be also applied to the interior of a density feature, such as when a density feature is inverted. In most situations, a density of −1 should be specified if inverted primitive type is desired. Otherwise, a resulting part of the density features may be infinitely large. If a falloff is provided for the density feature, the falloff applies to all surfaces of the density feature, unless the falloff has been overridden by a more specific falloff definition.

In FIGS. 7A-7G, examples of primitive types 701-760 are illustrated. For example, the primitive types can include without limitation: mesh, box, bar, ball, bolt and hole/cavity and group. In one embodiment, the mesh primitive type 701 can define one or more regions (such as regions 702, 703 and 704 of FIG. 7A) that enclose a volume. The box primitive type 710 may define a rectangular prism region (such as region 712 of FIG. 7B) with its origin in the center. The bar primitive type 720 can define a cylindrical region (such as region 722 of FIG. 7C) with its origin in the center and oriented along a Z-axis. The ball primitive type 730 can define a spherical region (such as region 732 of FIG. 7D) with its origin in the center.

Figure 7:
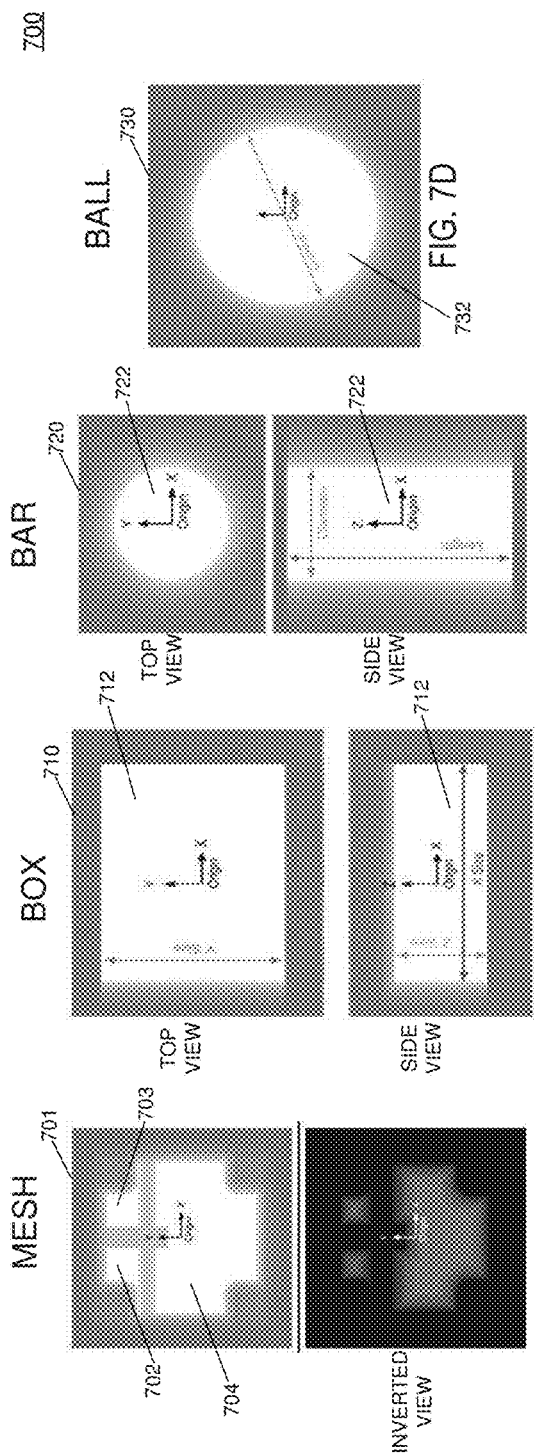
FIGS. 7A-7G illustrates examples of primitive types in accordance with in accordance with various implementations.

In some embodiments, the bolt primitive type 740 of FIG. 7E may represent a through-hole that a bolt or cap screw could pass through on its way to screwing into some structure. This feature may include additional parameters for the hole/cavity diameter parameter 742 for the shaft of the bolt as well as a desired head diameter parameter 744 and flange thickness parameter 746. The optional head clearance parameter 748 may reserve an empty space above the bolt for insertion/access and a falloff can be specified to blend this feature into the surrounding densities.

Referring to FIG. 7F, the hole/cavity primitive type 750 can represent a general hole feature that may include a few optional parameters, such as a hole diameter parameter 752, a depth parameter 754 and an encapsulate thickness parameter 756, which may indicate an amount of thickness of positive density to add around the hole and to indicate that a falloff is outside of this positive density. These optional parameters also include a capped parameter indicating that the bottom of the hole may be capped off (if the encapsulate thickness parameter 756 is specified). In that case, any falloff will be applied to the bottom surface if a falloff is present at this density feature.

With regards to FIG. 7G, the group primitive type 760 may represent a grouping of different primitive types for the density features. For example, as illustrated in FIG. 7G, a first box 762 primitive type and a second box 764 primitive type are shown layered together. In some embodiments, the density features of the two box primitives can be grouped into a hierarchical virtual layer stack that utilizes layers and opacity. For example, opacity may be an absolute value of the density. As such, densities of numerical "−1" and "1" may be "opaque" and may mask the densities in lower layers. A density of numerical "0" may be fully "transparent" and may allow the density defined in lower layers to show through. A group density feature may include an array structure of other density features that can include a number of primitives or other group features. In this regard, the first element of the array structure may be considered as the "bottom" layer, and therefore can be masked by all features later in the array.

Some density features parameters may also include loading scenario information that represents a number of loading scenarios to be applied in a physical simulation of that part of that part. The loading scenario information may include data indicating an optional amount of force (e.g., in newtons) and/or displacement (e.g., in mm) that may be applied. In some embodiments, the optional forces may be applied uniformly throughout the entire density feature. In other embodiments, these optional forces may be applied to one or more surfaces, edges, vertices of the density features or any combination thereof. Each loading scenario may include coordinates that may correspond to three degrees (e.g., X, Y, and Z axis) of freedom. In this regard, a degree of freedom that has not been specified may ignore any force applied in that degree of freedom in the loading scenario information.

In the event of groups primitive type contain overlapping solid regions with forces and/or displacements applied, the following rules may apply in the overlapping area: (1) if a density feature has a particular degree of freedom with a non-null displacement, forces in that degree of freedom will be ignored regardless of their relative precedence in the layer stack, (2) if multiple density features have a particular degree of freedom with a non-null displacement defined, the displacement of the highest density feature in the layer stack will prevail, and (3) if multiple density features have a particular degree of freedom with a non-zero force defined, the forces should be summed.

III. Computer Network Overview

Implementations of the present disclosure may include a method for optimizing geometries on a machine, a system or apparatus as part of or in relation to the machine, or a computer program product embodied in a non-transitory computer readable medium executing on one or more of the machines. The one or more processors may be part of a server, client, network infrastructure, mobile computing platform, stationary computing platform, or other computing platform.

The algorithms and displays presented herein are not inherently related to a particular computer or other apparatus. Rather, various general-purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to a particular programming language. It will be appreciated that a variety of programming languages can be used to implement the teachings of embodiments of the invention as described herein.

Unless specifically stated otherwise as apparent from the following discussion, it should be appreciated that throughout the description, discussions utilizing terms such as "initiating," "receiving," "generating," "providing," "sending," "detecting," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Figure 8:
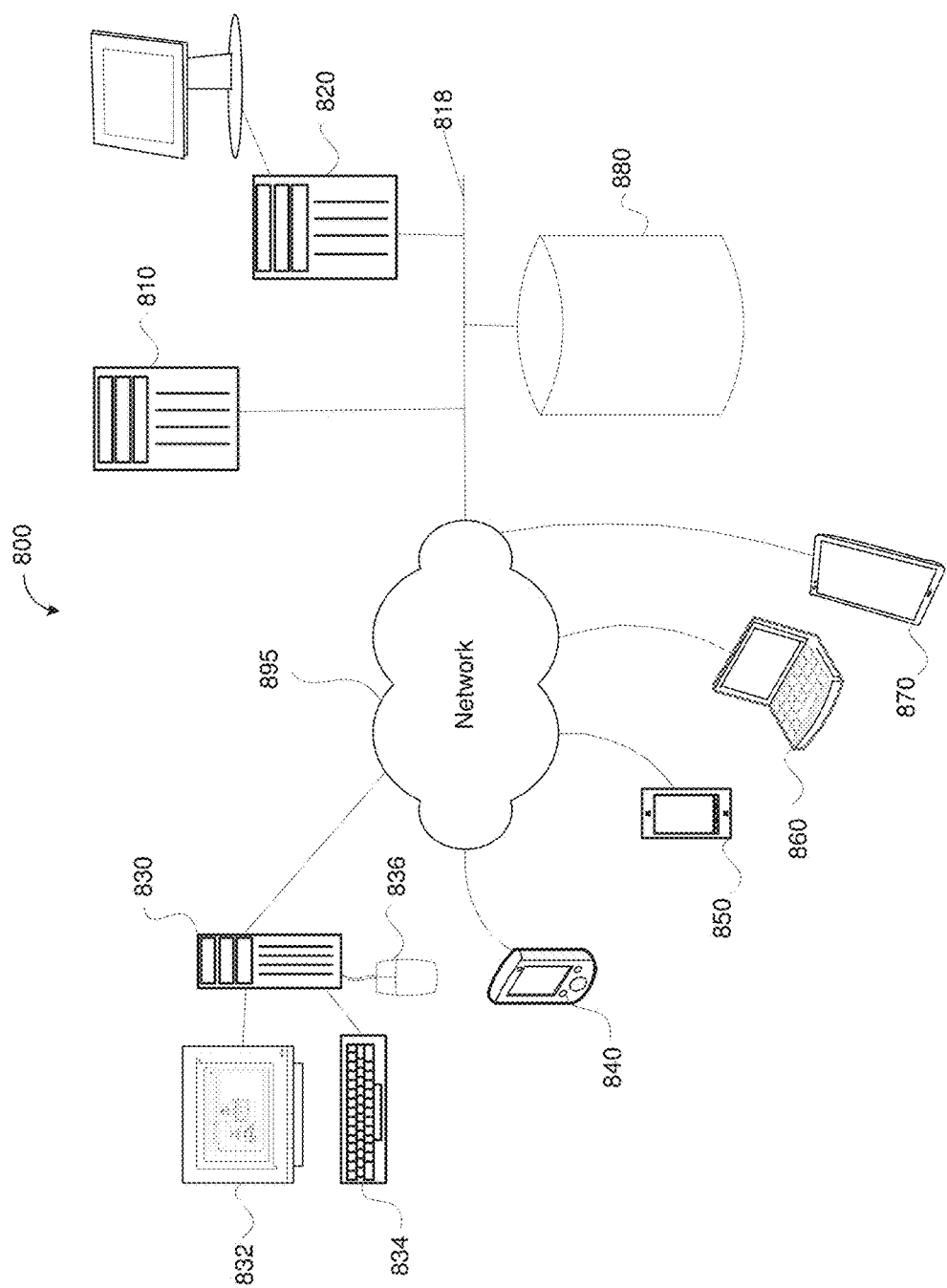
FIG. 8 illustrates an exemplary computer network in which various implementations of the present disclosure may operate.

FIG. 8 illustrates an exemplary computer network 800 in which various implementations of the present disclosure may operate. As illustrated, computer network 800 depicts various computing devices that can be used alone or in a networked configuration. For example, this figure of network 800 illustrates a distributed computer network having a plurality of server computing devices 810 and 820 as well as various type of client computing devices, such as computer terminal 830, PDA 840, cellular phone 850, laptop/netbook 860 and tablet 870 and other types of computing devices (not shown). These various devices may be interconnected via a local bus or direct connection 818 and/or may be coupled via a communications network 895, which may be wired or wireless, such as a LAN, WAN, the Internet, etc.

Each device may include, for example, user input devices such as a keyboard 834 and mouse 836 and/or various other types of input devices such as pen-inputs, joysticks, buttons, touch screens, etc., as well as a display 832, which could include, for instance, a CRT, LCD, plasma screen monitor, TV, projector, etc. Each device may be a personal computer, application server, etc. By way of example only, computing device 830 may be a personal computer while computing device 810 may be a server. Databases, such as database 880, may be accessible to one or more of the computing devices or other devices of network 800.

IV. Interface Portal Overview

To interact with aspects of computer network 800 for performing one or more of the operations described herein, a client computing device (such as client computing devices 830-870 of FIG. 8) may include an interface portal 900. In some embodiments, users may have to install an application and/or select a service, such as a web service, associated with the interface portal 900 in order to obtain the benefits of the techniques described herein. In some embodiments, the application may be downloaded onto the client computing device. For example, the users may select to download the application from the service associated with a server. The application may be installed locally at the computing device. Alternatively, the application can be stored at the service and may be simply accessed through the computing device, for example, via a web browser.

Figure 9:
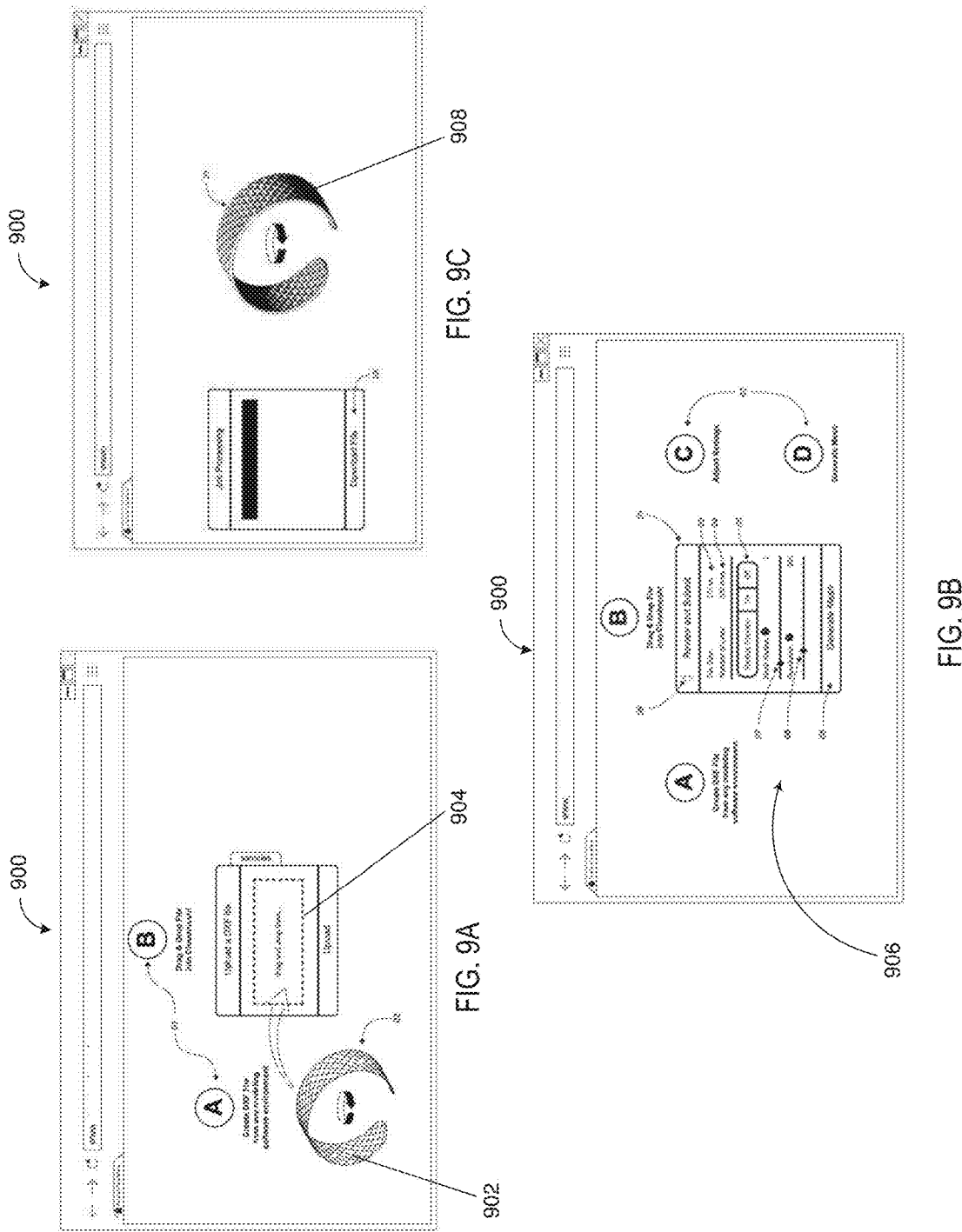
FIGS. 9A-9C illustrates an example of an interface portal in accordance with various implementations.

In FIG. 9A, users may submit a geometry 902 through the interface portal 900. For example, a vector file that may comprise vector data for the geometry 902 can be dragged by a user into file input controller 904 of the interface portal 900 for uploading. In some embodiments, the vector data for the geometry 902 may be transmitted electronically to one or more computing servers, such as computing servers 810 and 820, for processing via network 895. Once the user file is uploaded, the file input controller 904 may turn into to a settings controller 906.

As illustrated in FIG. 9B, the settings controller 906 may include various controls, buttons and/or sliders or other type of input device controllers for adjusting parameters, such as the density feature parameters, associated with optimizing the input geometry as well as other type of input and output parameters. After the settings have been adjusted to desired levels, the geometry 902 may be processed.

Referring to FIG. 9C, once the processing is complete, a rendered 3D mesh 908 of the geometry 902 may be displayed at a display portion of the interface portal 900. In some embodiments, mapping data for 3D printing of the rendered 3D mesh 908 may also be generated and returned to the user in a specified output file format. In alternative embodiments, the mapping data may be used in other types of manufacturing techniques (e.g., casting, injection molding, etc.) to create the 3D mesh 908.

VI. Flow Diagram Overview

Figure 10:
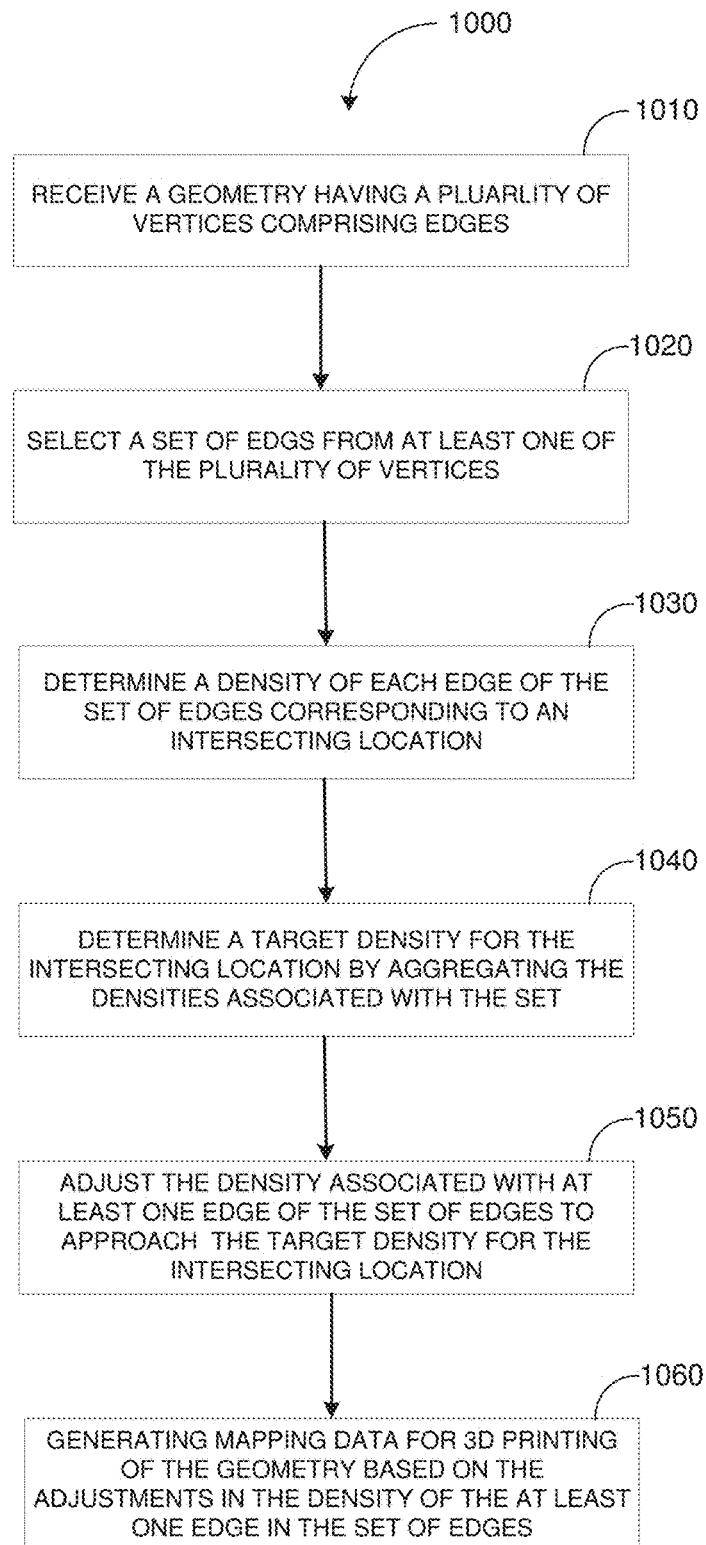
FIG. 10 illustrates a flow diagram of a method in accordance with in accordance with various implementations.

To better aid in understanding an example of some of the aspects described above, for example, that are related to optimizing geometries, reference is now made to example flow diagram 1000 of FIG. 10, which illustrates a method. Operations described in flow diagram 1000 can be performed by processing logic that can comprise hardware (e.g., circuitry, dedicated logic, programmable logic, microcode, etc.), software (e.g., instructions run on a processing device), or a combination thereof. It should be noted that the following operations do not have to be performed in the precise order described below. Rather, various operations can be handled in a different order or simultaneously, and some operations may be added or omitted.

In block 1010, a geometry comprising a plurality of edges may be received. For example, the geometry may be received at a service, for example, via a network connection. The edges may define a body of the geometry. In some embodiment, the service may receive a data file that includes a mapping of the edges to the geometry.

In block 1020, a set of edges from the plurality of edges may be selected. For example, the set of edges may be selected based on an intersecting location where two or more the edges intersect. This intersecting location may include a falloff that indicates a transitional location from a portion of one edge to another edge.

In block 1030, a density of each edge in the set of edges may be determined. This density may correspond to the intersecting location for the set of edges. In some embodiments, the density may be determined by estimating the density of density features associated with each edge in the set. These density features can include one or more density parameters that may indicate how an edge of a particular density feature transitions to another density feature.

In block 1040, a target density for the intersecting location may be determined by aggregating the densities associated with the set. For example, a sum of the densities associated with the density features may be used to determine a gradient associated with the target density for the intersecting location.

In block 1050, the density associated with at least one edge of the set of edges may be adjusted to approach the target density of the intersecting location. For example, material may be added or remove to the least one edge so that the target density of the intersecting location can be met.

In block 1060, mapping data for 3D printing of the geometry may be generated based on the adjustment in the density performed in block 1050 on the at least one edge in the set. For example, an output file may be generated by the service in block 1010 that includes mapping data from generating the updated geometry using a 3D printing application.

V. System Overview

Figure 11:
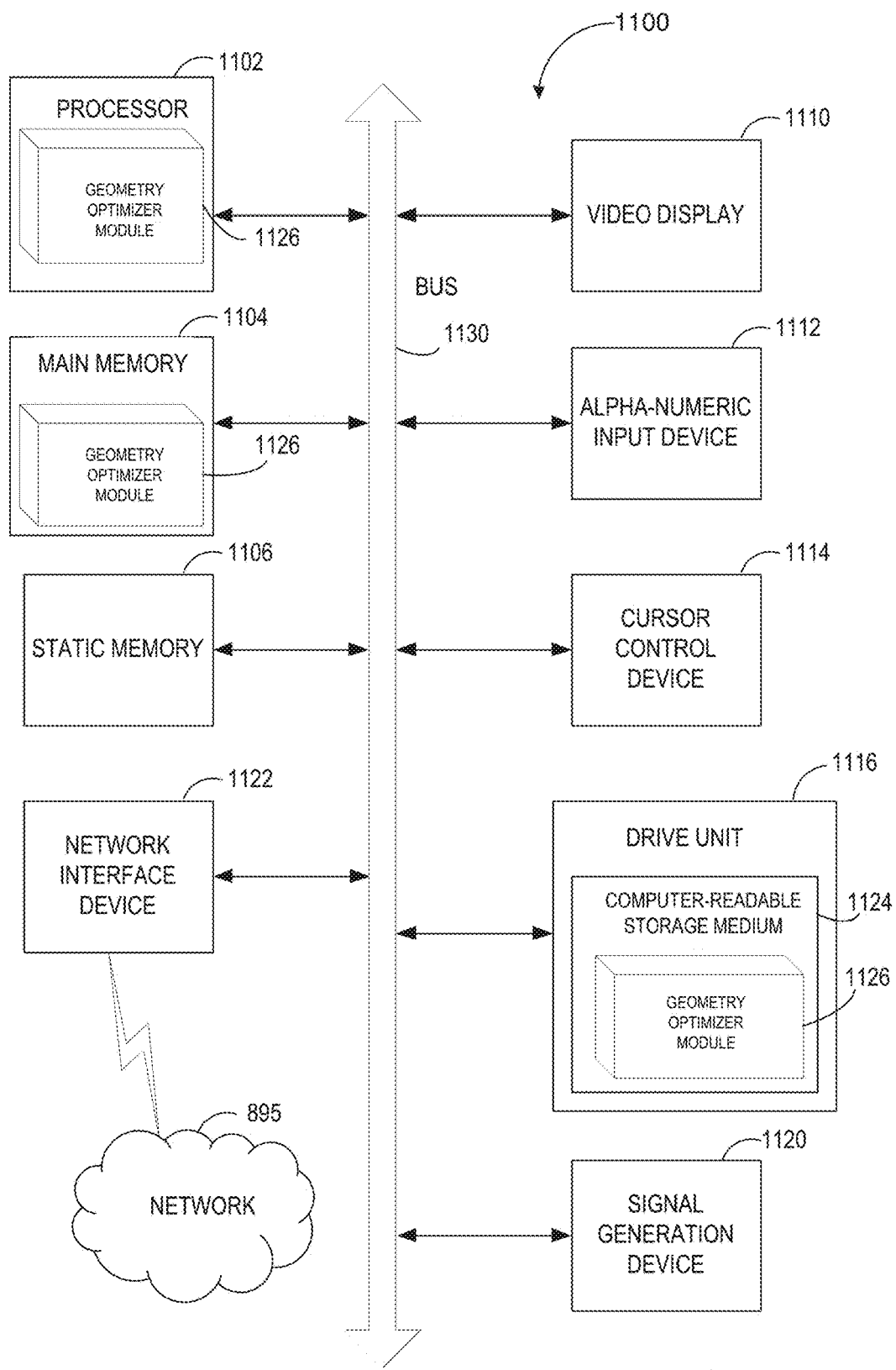
FIG. 11 illustrates a diagram of a machine in the exemplary form of a computer system configured to perform one or more of the operations described herein.

FIG. 11 is a block diagram illustrating a machine in the exemplary form of a computer system 1100 in accordance with various implementations. Within the computer system 1100 is a set of instructions for causing the machine to perform one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or a machine capable of executing a set of instructions (sequential or otherwise) that specify actions to be taken by that machine. Further, while only a single machine is illustrated, the term "machine" shall also be taken to include a collection of machines (e.g., computers) that individually or jointly execute a set (or multiple sets) of instructions to perform one or more of the methodologies discussed herein.

The computer system 1100 includes a processing device 1102, a main memory 1104 (e.g., read-only memory (ROM), flash memory, dynamic random access memory (DRAM) such as synchronous DRAM (SDRAM) or DRAM (RDRAM), etc.), a static memory 1106 (e.g., flash memory, static random access memory (SRAM), etc.), and a secondary memory (e.g., a data storage device in the form of a drive unit 1116, which may include fixed or removable computer-readable storage medium), which communicate with each other via a bus 1130.

Processing device 1102 represents one or more general-purpose processors such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 1102 is configured to execute the geometry optimizer module 1126 for performing the operations and steps discussed herein. For example, in one embodiment, flow diagram 1000 may be performed by the geometry optimizer module 1126.

The processing device 1102 may be capable of executing program instructions, codes, binary instructions and the like. The processor may include memory that stores methods, codes, instructions and programs as described herein and elsewhere. The processor may access a computer-readable storage medium through an interface that may store methods, codes, and instructions as described herein and elsewhere. The computer-readable storage medium associated with the processor for storing methods, programs, codes, program instructions or other type of instructions capable of being executed by the computing or processing device may include but may not be limited to one or more floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

The computer system 1100 may further include a network interface device 1122. The computer system 1100 also may include a video display unit 1110 (e.g., a liquid crystal display (LCD) or a cathode ray tube (CRT)) connected to the computer system 1100 through a graphics port and graphics chipset, an alphanumeric input device 1112 (e.g., a keyboard), a cursor control device 1114 (e.g., a mouse), and a signal generation device 1120 (e.g., a speaker).

The drive unit 1116 or secondary memory may include a machine-readable storage medium (or more specifically a non-transitory computer-readable storage medium) 1124 on which is stored one or more sets of instructions (e.g., the geometry optimizer module 1126) embodying one or more of the methodologies or functions described herein. The geometry optimizer module 1126 may also reside, completely or at least partially, within the main memory 1104 and/or within the processing device 1102 during execution thereof by the computer system 1100, the main memory 1104 and the processing device 1102 also constituting machine-readable storage media. The geometry optimizer module 1126 may further be transmitted or received over a network 895 via the network interface device 1122.

The non-transitory computer-readable storage medium 1124 may also be used to store the geometry optimizer module 1126 persistently. While the computer-readable storage medium 1124 is shown in as a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include a medium that is capable of storing or encoding a set of instructions for execution by the machine and that cause the machine to perform one or more of the methodologies of the present invention. The term "computer-readable storage medium" shall accordingly be taken to include, but not be limited to, solid-state memories, and optical and magnetic media.

The geometry optimizer module 1126, components and other features described herein can be implemented as discrete hardware components or integrated in the functionality of hardware components such as ASICS, FPGAs, DSPs or similar devices. In addition, the geometry optimizer module 1126 can be implemented as firmware or functional circuitry within hardware devices. Further, the geometry optimizer module 1126 can be implemented in a combination hardware devices and software components. For example, the functionality of this module can exist in a fewer or greater number of modules than what is shown, with such modules residing at one or more computing devices that may be geographically dispersed. The modules may be operable in conjunction with network 895 from which it may receive and provide relevant information regarding geometries.

Some portions of the above-disclosure are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present invention. In the foregoing, implementations of the present disclosure have been described with reference to specific example implementations thereof. The specification and drawings are to be regarded in an illustrative sense rather that a restrictive sense. It will be evident various modifications and combinations of the features discussed above can be utilized without departing from the disclosure as set forth in the following claims.

What is claimed is:

1. A computer-implemented method, the method comprising:
   receiving, at a first computing device, a geometry for a 3D printed component;
   receiving, via a graphical user interface, a user selection of edges of an intersection of the geometry;
   determining, at the first computing device, a first scalar density value for at least one edge of the intersection, wherein the first scalar density value is at least partially based on the received geometry for the 3D printed component;
   determining, at the first computing device, a second scalar density value for the at least one edge, wherein the second scalar density value is associated with a target scalar density value that is at least partially based on a mechanical loading parameter for the 3D printed component;
   computing, at the first computing device, a third scalar density value for the at least one edge at least partially based on a comparison of the first scalar density value to the second scalar density value; and
   providing, via the computing device, to a 3D printing device for manufacturing a modified geometry at least partially base on the third scalar density value, wherein the 3D printing device manufactures the provided modified geometry at least partially based on the third scalar density value.

2. The computer-implemented method of claim 1, wherein determining the second scalar density value further comprises determining a density multiplier for the at least one edge.

3. The computer-implemented method of claim 2, wherein determining the density multiplier comprises receiving scale data indicating a distance that the intersection is from a surface.

4. The computer-implemented method of claim 2, wherein determining the density multiplier comprises receiving offset data indicating an amount of shift for the intersection with respect to a surface.

5. The computer-implemented method of claim 2, wherein determining the density multiplier comprises receiving profile data indicating a shape of the intersection.

6. The computer-implemented method of claim 1, wherein the mechanical loading parameter is based on at least one of the following:
   amount of force applied to the 3D printed component;
   weight of the 3D printed component;
   displacement applied to the 3D printed component;
   real-world simulation data applied to the 3D printed component; or
   any combination thereof.

7. The computer-implemented method of claim 6, wherein the mechanical loading parameter is partially based on a threshold level.

8. The computer-implemented method of claim 1, wherein the second scalar density value is associated with a transition of density values at the intersection.

9. The computer-implemented method of claim 1, wherein the selection of edges is associated with a through-hole for a bolt, cap, or screw.

10. A system, comprising:
    a processor coupled to a memory device, the memory device storing instructions that, when executed by a processor, cause a computer to perform a method for 3D printing, the method comprising:
    receiving a geometry for a 3D printed component;
    receiving, via a graphical user interface, a user selection of edges of an intersection of edges of the geometry;
    determining a first scalar density value for at least one edge of the intersection, wherein the first scalar density value is at least partially based on the received geometry for the 3D printed component;
    determining a second scalar density value for the at least one edge,
    wherein the second scalar density value is associated with a target scalar density value that is at least partially based on a mechanical loading parameter for the 3D printed component;
    computing a third scalar density value for the at least one edge at least partially based on a comparison of the first scalar density value to the second scalar density value; and providing to a 3D printing device for manufacturing a modified geometry at least partially base on the third scalar density value, wherein the 3D printing device manufactures the provided modified geometry at least partially based on the third scalar density value.

11. The system of claim 10, wherein determining the second scalar density value further comprises determining a density multiplier for the at least one edge.

12. The system of claim 11, wherein determining the density multiplier comprises receiving scale data indicating a distance that the intersection is from a surface.

13. The system of claim 11, wherein determining the density multiplier comprises receiving offset data indicating an amount of shift for the intersection with respect to a surface.

14. The system of claim 11, wherein determining the density multiplier further comprises receiving profile data indicating a shape of the intersection.

15. The system of claim 10, wherein providing a modified geometry for the 3D printed component causes the 3D printed component to add or remove material from the 3D printed component based on comparison of the geometry to the modified geometry.

16. The system of claim 10, wherein the selection of edges is associated with a through-hole for a bolt, cap, or screw.

17. The system of claim 10, wherein the mechanical loading parameter is based on at least one of the following:
   amount of force applied to the 3D printed component;
   weight of the 3D printed component;
   displacement applied to the 3D printed component;
   real-world simulation data applied to the 3D printed component; or
   any combination thereof.

18. The system of claim 10, wherein the mechanical loading parameter is at least partially based on a threshold level.

19. A non-transitory computer-readable medium storing executable instructions that, when executed by a processor, cause a processor to perform a method, the method comprising:
   receiving a geometry for a 3D printed component;
   receiving a user selection of edges of an intersection of the geometry;
   determining a first scalar density value for at least one edge of the intersection, wherein the first scalar density value is partially based on the received geometry for the 3D printed component;
   determining a second scalar density value for the at least one edge of the intersection,
      wherein the second scalar density value is associated with a target scalar density value that is at least partially based on a mechanical loading parameter for the 3D printed component;
   computing a third scalar density value for the at least one edge partially based on a comparison of the first scalar density value to the second scalar density value; and
   providing, via the computing device, to a 3D printing device for manufacturing a modified geometry at least partially base on the third scalar density value, wherein the 3D printing device manufactures the provided modified geometry at least partially based on the third scalar density value.

20. The non-transitory computer-readable medium of claim 19, wherein the mechanical loading parameter is based on at least one of the following:
   amount of force applied to the 3D printed component;
   particular weight of the 3D printed component;
   displacement applied to the 3D printed component;
   real-world simulation data applied to the 3D printed component; or
   any combination thereof.

* * * * *